Patented Oct. 12, 1954

2,691,677

UNITED STATES PATENT OFFICE 2,691,677

ANTICHOLINESTERASE DERIVATIVES

Frederick Charles Copp, London, England, assignor to Burroughs Wellcome & Co. (U. S. A.) Inc., Tuckahoe, N. Y., a corporation of New York No Drawing. Application October 3, 1952, Serial No. 313,080

Claims priority, application Great Britain October 11, 1951

7 Claims. (Cl. 260—567.6)

The present invention relates to new chemical compounds exhibiting anti-cholinesterase activity and useful in the treatment of myasthenia gravis.

In the British Journal of Pharmacology and Chemotherapy, volume 4, page 219, 1949, the anti-cholinesterase activity of the compound 1:5-bis-(4 - trimethylammoniumphenyl) - pentan - 3-one diiodide, (Formula I) is described.

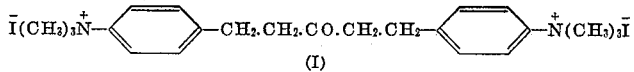

By further research into allied compounds it has now been found that higher anti-cholinesterase activity is exhibited by compounds of the general Formula II, in which R is a normal propyl, or allyl group (R=—$CH_2.CH_2.CH_3$ or —$CH_2.CH:CH_2$), and X is an anion.

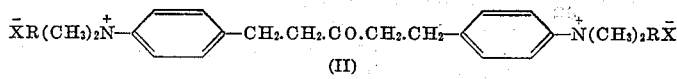

If R is an alkyl group containing less or more than 3 carbon atoms or is a benzyl group, the anti-cholinesterase activity is considerably less than that shown by the compounds in which R is an n-propyl or allyl group.

The compounds of the general series represented by Formula II show a marked inhibitory action on true cholinesterase and very little action on pseudo-cholinesterase. The compounds of the present invention show even more marked selectivity for true cholinesterase than does the known compound (I). The limiting molar concentration at which they cause a substantial inhibition of cholinesterase activity is approximately ⅕ to 1/16 of the lowest molar concentration at which the compound of Formula I causes a similar inhibition of the enzyme. Nevertheless the new and the known compounds have substantially similar toxicities when injected intravenously into mice. Therefore it is an additional advantage of the compounds of the present invention that they have a larger margin of safety than the known compound.

The nature of the anion X is unimportant, and may conveniently be, for example, chloride iodide, bromide or methansulphonoxy. The compounds are prepared by reacting 1:5-bis(4-dimethylaminophenyl)pentan-3-one (Formula III) with a compound of the RY,

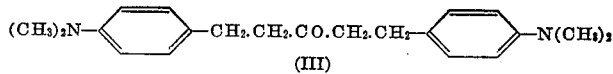

in which R is a normal propyl or allyl radical, and Y is a group which will form an anion in the final quaternary compound and which may be the same as X or different. The group Y may be converted to the group X by any convenient double decomposition reaction.

The reaction may conveniently be performed in a solvent such as propanol, ethanol or acetone.

The invention will now be described with reference to the following examples in which all temperatures are given in degrees centigrade.

Example 1

1:5 - bis(4 - dimethylaminophenyl)pentan - 3-one (1 g.) was dissolved in acetone (5 ml.), allyl iodide (2 g.) added and the resulting solution heated under reflux. A crystalline solid rapidly separated from the solution. After 30 minutes the reaction mixture was cooled, the solid filtered and dried in a vacuum desiccator and the resulting 1:5 - bis(4 - allyldimethylammoniumphenyl) - pentan-3-one diiodide crystallized from methanol as colorless flat needles, melting point 179.5–180.5° (with decomposition). Yield 1.7 g. (The melting point of this and all other compounds described in this specification are much influenced by the rate of heating.)

Example 2

1:5 - bis(4 - dimethylaminophenyl)pentan - 3-one (1 g.) and allyl iodide (2.0 g.) were reacted together in boiling ethanol (5 ml.). After 30 minutes, the solution was cooled. The separated solid, 1:5-bis(4-allyldimethylammoniumphenyl)-pentan-3-one diiodide, was collected and crystallized from methanol, and had a melting point of 179.5–180.5°. Yield 1.4 g.

Example 3

1:5 - bis(4 - dimethylaminophenyl)pentan - 3-one (1 g.) and allyl bromide (2 ml.) were reacted together in boiling acetone (5 ml.). After 1 hour, the semi-solid mixture was cooled and the resulting 1:5-bis(4-allyldimethylammoniumphenyl)-pentan-3-one dibromide collected and crystallized from ethanol, when it formed colorless plates, melting point 198–199°.

*Example 4*

1:5-bis(4-allyldimethylaminophenyl)pentan-3-one diiodide (1 g.), prepared as in Examples 1 or 2, was added to a suspension of finely-divided silver bromide (3 g.) in water (10 ml.). The mixture was stirred and heated to boiling for 15 minutes, filtered and the filtrate evaporated under reduced pressure. Acetone was added to the residual gum which rapidly crystallized. The acetone was decanted and the residue recrystallized from ethanol to give colorless plates of 1:5-bis(4-allyldimethylammoniumphenyl)pentan-3-one dibromide, melting point 198–199°.

By use of silver chloride in place of silver bromide there results 1:5-bis(4-allyldimethylammoniumphenyl)pentan - 3 - one dichloride; it is very deliquescent.

*Example 5*

1:5 - bis(4 - dimethylaminophenyl)pentan - 3-one (1 g.) and allyl methane sulphonate (4 g.) were reacted together in boiling acetone. An oil slowly separated. After 4 hours, the mixture was cooled and the supernatant liquid decanted off the product, which was a gum. This product, 1:5 - bis(4 - allyldimethylammoniumphenyl)-pentan-3-one-bis(methane sulphonate) was dissolved in water (10 ml.) and excess potassium iodide (8 g.) added. An oil separated which rapidly solidified. This solid was filtered, washed with a little cold water and pressed on a porous plate to dry. On repeated crystallization from methanol, it gave pure 1:5-bis(4-allyldimethylammoniumphenyl)pentan-3-one diiodide, melting point 179–180°. (Yield 1.0 g.).

*Example 6*

1:5 - bis(4 - dimethylaminophenyl)pentan - 3-one (2 g.) was reacted with n-propyl iodide (4 ml.) in boiling n-propanol (10 ml.). After 3 hours, the solution was cooled to give a gum which crystallized on standing at 0°. It was recrystallized from ethanol and formed short, thick needles of 1:5-bis(4-dimethylpropylammoniumphenyl)-pentan-3-one diiodide (1.8 g.), melting point 180°.

*Example 7*

1:5 - bis(4 - dimethylaminophenyl)pentan - 3-one (10 g.) and n-propyl bromide (20 ml.) were dissolved together in n-propanol (50 ml.) and the solution heated to reflux for 2 hours. The bulk of the solvent was then removed under reduced pressure and acetone (50 ml.) added to the residue, which then crystallized. The solid was collected, dissolved in ethanol and the solution shaken with charcoal and filtered. The filtrate was concentrated and acetone added, to give crystals of 1:5 - bis(4 - dimethylpropylammoniumphenyl)-pentan-3-one dibromide, melting point 187–189°.

I claim:

1. Compounds of the formula:

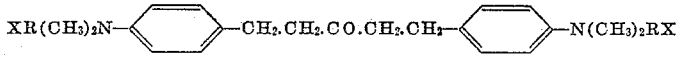

wherein R is selected from the class consisting of propyl and allyl groups, and X is the anion of a therapeutically acceptable acid.

2. A di-quaternary salt of the cation 1:5-bis-(4 - allyldimethylammoniumphenyl)pentan - 3-one in combination with a therapeutically acceptable acid.

3. A di-quaternary salt of the cation 1:5-bis(4-dimethylpropylammoniumphenyl)pentan - 3-one in combination with a therapeutically acceptable acid.

4. 1:5 - bis(4-allyldimethylammoniumphenyl)-pentan-3-one diiodide.

5. 1:5 - bis(4 - dimethylpropylammoniumphenyl)pentan-3-one diiode.

6. 1:5 - bis(4-allyldimethylammoniumphenyl)-pentan-3-one dibromide.

7. 1:5 - bis(4-allyldimethylammoniumphenyl)-pentan-3-one dichloride.

References Cited in the file of this patent

Burgen, "Br. J. Pharmacol and Chemotherapy," vol. 4 (1949, p. 223.